United States Patent
Ogai

Patent Number: 6,149,877
Date of Patent: *Nov. 21, 2000

[54] EXHAUST GAS PURIFYING CATALYST

[75] Inventor: Masahiko Ogai, Toyota, Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/007,779

[22] Filed: Jan. 16, 1998

[30] Foreign Application Priority Data

Jan. 21, 1997 [JP] Japan .................. 9-008655
Jan. 13, 1998 [JP] Japan .................. 10-004757

[51] Int. Cl.$^7$ .................................. B01D 53/34
[52] U.S. Cl. .................. 422/180; 422/171; 422/177; 422/222
[58] Field of Search .............. 422/171, 177, 422/174, 180, 222; 502/527.12, 527.18, 527.19–527.22; 428/116, 593, 594

[56] References Cited

U.S. PATENT DOCUMENTS

| | | | |
|---|---|---|---|
| 3,441,381 | 4/1969 | Keith et al. | 422/180 |
| 4,335,023 | 6/1982 | Dettling et al. | 422/180 |
| 4,476,246 | 10/1984 | Kim et al. | 502/304 |
| 4,522,792 | 6/1985 | Brennan | 423/213.5 |
| 5,162,287 | 11/1992 | Yoshimoto et al. | 502/439 |

FOREIGN PATENT DOCUMENTS

| | | |
|---|---|---|
| 407 915 | 1/1991 | European Pat. Off. |
| 0 716 876 A1 | 6/1996 | European Pat. Off. |
| 5-317652 | 12/1993 | Japan . |
| 8-238431 | 9/1996 | Japan . |

*Primary Examiner*—Hien Tran
*Attorney, Agent, or Firm*—Oliff & Berridge, PLC

[57] ABSTRACT

In an exhaust gas purifying catalyst, a catalyst supporting layer is formed on a surface of a cell wall of a honeycomb base member, and a catalytic noble metal and a NOx adsorbing material are loaded on the catalyst supporting layer. The portion of the catalyst supporting layer present within a depth of 100 $\mu$m constitutes at least 80% by volume relative to a total volume of the catalyst supporting layer. The catalyst maintains a high probability of contact of emissions with the NOx adsorber and the catalytic noble metal, and allows easy decomposition of the sulfuric acid salt produced by sulfur poising of the NOx adsorber, thereby ensuring reliable recovery of the NOx purifying performance.

20 Claims, 6 Drawing Sheets

PRIOR ART

EXHAUST GAS PURIFYING CATALYST

The entire disclosure of Japanese Patent Application No. Hei 9-8655 filed on Jan. 21, 1997 including the specification, drawings and abstract is incorporated herein by reference in its entirety.

BACKGROUND OF THE INVENTION

1. Field of the Invention

The present invention relates to an exhaust gas purifying catalyst for purifying exhaust gas discharged from an internal combustion engine of, for example, a motor vehicle, and, more particularly, to an exhaust gas purifying catalyst capable of efficiently purifying nitrogen oxides (NOx) by reduction, from exhaust gas that contains an amount of oxygen in excess of the oxygen amount required for complete oxidation of the reducing components of the exhaust gas, such as carbon monoxide (CO), hydrogen gas ($H_2$), carbon hydride (HC) and the like.

2. Description of the Related Art

Many conventional motor vehicles employ three-way catalyst that purify exhaust gas by simultaneously oxidizing CO and HC and reducing NOx in exhaust gas at a theoretical air-fuel ratio (stoichiometric ratio). In a widely known three-way catalyst of this type, a honeycomb base member formed of, for example, cordierite, carries thereon a catalyst supporting layer formed of γ-alumina, and the catalyst supporting layer supports catalytic noble metals such as platinum (Pt), rhodium (Rh) and the like.

Recently, carbon dioxide ($CO_2$) in exhaust gas from internal combustion engines of motor vehicles and the like has become an issue in view of protection of global environments. A promising technology for reducing the amount of $CO_2$ emission from an internal combustion engine is a lean burn system, in which combustion is performed at a lean air-fuel ratio with an excess amount of oxygen. The lean burn system reduces fuel consumption and, therefore, reduces the amount of $CO_2$ produced by combustion.

Since the conventional three-way catalyst achieve simultaneous oxidation of CO and HC and reduction of NOx in exhaust gas when the air-fuel ratio is substantially the stoichiometric ratio, the conventional three-way catalyst fail to sufficiently remove NOx by reduction in lean-burnt exhaust gas, which contains an excess amount of oxygen. Therefore, there has been a need for development of a catalyst and an exhaust gas purifying system capable of purifying NOx even in an excess-oxygen(lean) atmosphere.

The present applicant proposed in, for example, Japanese Patent Laid-Open No. Hei 5-317652, an exhaust gas purifying catalyst in which an alkaline earth metal, such as barium (Ba) or the like, and platinum (Pt) are supported by a catalyst supporting layer formed of alumina or the like. Using the exhaust gas purifying catalyst, NOx can be efficiently removed from exhaust gas from a lean burn system if the air-fuel ratio is controlled so that the air-fuel ratio shifts from a lean side to a stoichiometric/rich side in a pulsed manner. NOx is adsorbed by the alkaline earth metal (NOx adsorber) on the lean side, and reacts with reducing components, such as HC, CO and the like, on stoichiometric/rich side.

To improve exhaust gas purifying performance, it is necessary to increase the probability of contact of emissions with the catalytic noble metal and the NOx adsorber. For this end, it is a main-stream practice to use active alumina, having a great specific surface area, to form a catalyst support layer. A normally employed base member is a honeycomb base member having a cell concentration of 400 cells/inch$^2$, for an increased geometric surface area.

A greater absolute amount of the catalyst supporting layer is more favorable in order to sufficiently disperse the catalytic noble metal and the NOx adsorber. However, an increase in thickness of the catalyst supporting layer results in narrowed honeycomb channels and, therefore, an increased exhaust gas passage resistance. Therefore, in conventional exhaust gas purifying catalysts employing honeycomb base members with a cell concentration of about 400 cells/inch$^2$, the amount of the catalyst supporting layer formed is normally set to about 120–240 g relative to 1 liter of the honeycomb base member.

In a normal method for forming a catalyst supporting layer on cell walls of a honeycomb base member, a base member is dipped into an aqueous slurry containing active alumina as a main component and, after the base member is pulled out of the slurry, extraneous slurry is removed from interiors of the cells by blowing from an rear end surface of the base member. The base member is then dried and baked, thereby forming a catalyst supporting layer.

In an exhaust gas purifying catalyst having a NOx adsorber, sulfur (S) contained in fuel is oxidized into $SO_2$, which is further oxidized on the catalyst into $SO_3$ or $SO_4$, and these substances in turn react with the NOx adsorber, producing sulfuric acid salts of NOx adsorber. The NOx adsorbing capacity is thus lost, thereby impeding the removal of NOx by reduction. This undesired phenomena is termed sulfur-poisoning of NOx adsorber.

The sulfate of NOx adsorber can be re-generated into NOx adsorber by reduction at, for example, 650° C. or higher in a rich or stoichiometric atmosphere before crystallization of the sulfate progresses. Once the crystallization progresses, however, the reduction of the sulfate becomes difficult even in a rich atmosphere, and the NOx purifying performance significantly decreases.

SUMMARY OF THE INVENTION

Accordingly, it is an object of the present invention to further improve NOx purifying performance and, as the same time, improve durability by controlling the sulfur poisoning of the NOx adsorber.

According to the invention, there is provided an exhaust gas purifying catalyst including a base member having a honeycomb structure, a catalyst supporting layer formed on a surface of a cell wall of the base member, a catalytic noble metal supported by the catalyst supporting layer, and a NOx adsorbing material supported by the catalyst supporting layer. A portion of the catalyst supporting layer present within a depth of 100 μm is at least 80% by volume relative to a total volume of the catalyst supporting layer.

BRIEF DESCRIPTION OF THE DRAWINGS

The foregoing and further objects, features and advantages of the present invention will become apparent from the following description of the invention with reference to the accompanying drawings, wherein like numerals are used to represent like elements and wherein.

DETAILED DESCRIPTION OF INVENTION

The NOx adsorbing and releasing reactions are considered to be basically the same as the SOx adsorbing and releasing reactions. That is, NOx or SOx is adsorbed by the NOx adsorbing material (adsorber) in a lean atmosphere, and released therefrom and reduced in a stoichiometric or rich atmosphere. The adsorbing and releasing efficiency depends on the probability of contact of NOx or SOx with the NOx adsorber. The probability of contact of NOx or SOx with the NOx adsorber is considered to be significantly dependent on the distance between the surface of the catalyst supporting layer and the NOx adsorber supported by the catalyst supporting layer, on the basis of the gas diffusion behavior.

Figure 9:
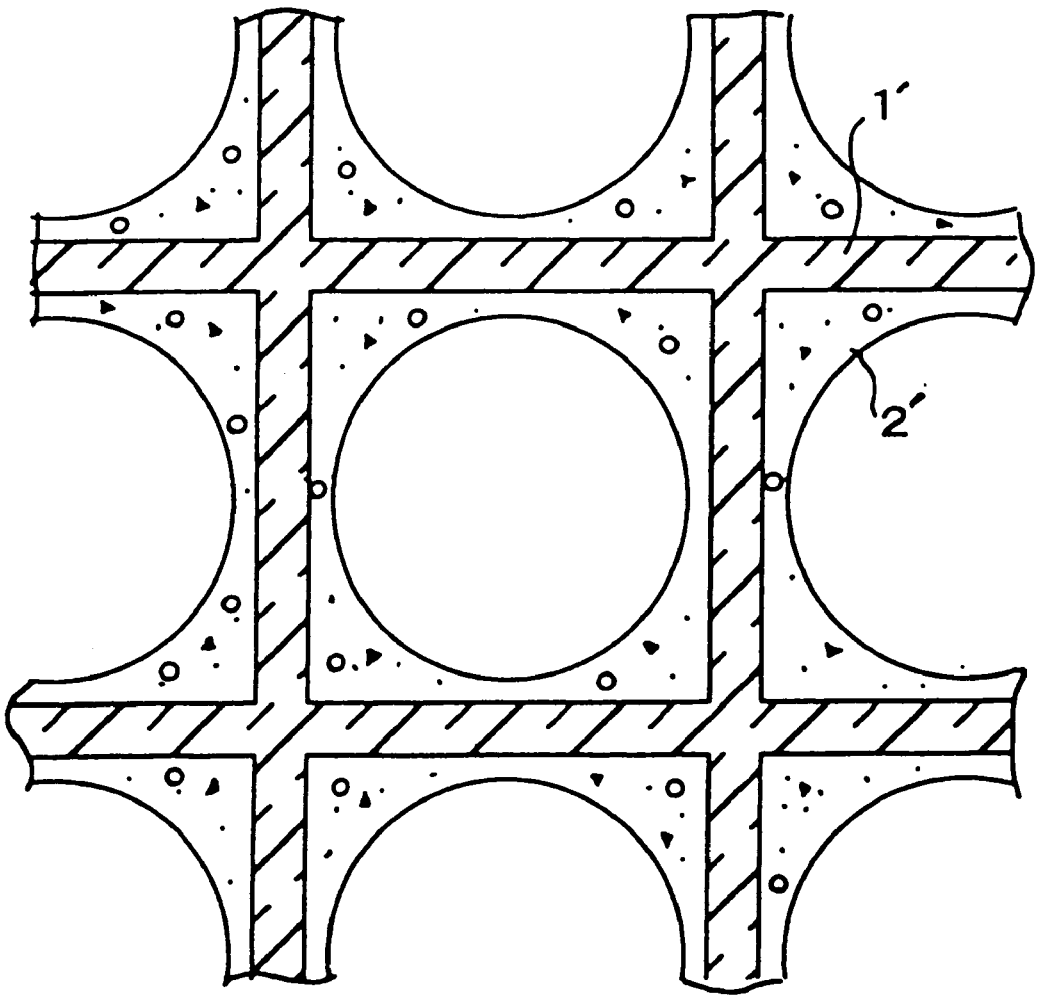
FIG. 9 is an enlarged sectional view of a portion of an exhaust gas purifying catalyst in Comparative Example 1.

An active alumina-containing slurry used to form the catalyst supporting layer has a dispersion medium of water, which has a high surface tension. The opening of cells of a honeycomb base member is substantially square. Therefore, the slurry deposited on walls of cells of the honeycomb base member tends to form openings having a circular sectional shape due to the surface tension, so that the catalyst supporting layer formed of the slurry deposit has irregular thicknesses that vary depending on locations on the cell walls as shown in FIG. 9.

The present inventor investigated the thickness of a catalyst supporting layer, the NOx adsorbing and releasing performance, and the extent of sulfur poisoning. The results show that NOx adsorber present in shallow portions of the catalyst supporting layer proximate to the surface exhibits higher NOx and SOx adsorbing and reducing efficiencies, and NOx adsorber present deep inside the catalyst supporting layer exhibits lower NOx and SOx adsorbing and reducing efficiencies. The reason is speculated that in a case as in a rich spike wherein a reducing atmosphere lasts only for as short period as 0.1 to several seconds, exhaust gas does not penetrate deep inside the catalyst supporting layer during such a short time and, therefore, the contact of the reducing components of exhaust gas with NOx or SOx adsorbed by NOx adsorber present deep inside the layer becomes unlikely.

The NOx adsorber can be fully used by reducing the thickness of the catalyst supporting layer, for example, reducing the amount of catalyst supporting layer to a level of 100 g or less relative to 1 liter of the base member. However, such a thickness reduction degrades the dispersion of a catalytic noble metal and a NOx adsorber and, therefore, reduces the reaction efficiency, as discussed above. Furthermore, a thickness reduction of the catalyst supporting layer also increases the likelihood of aggregation due to heat. Therefore, reduction of the thickness of the catalyst supporting layer is allowed only to a limited extent.

From the above-stated factors, it has become clear that it is desirable to form the catalyst supporting layer with as uniform a thickness as possible while the weight proportions of the components of the catalyst supporting layer, and the total amount thereof, are maintained at substantially the same levels as in the conventional art.

Through researches based on the aforementioned finding, the present inventor have found that there exist optimal values for the depth of the catalyst supporting layer from the surface and for the depth distribution, thereby accomplishing the invention.

In the exhaust gas purifying catalyst of the invention, a portion of the catalyst supporting layer present within a depth of 100 $\mu$m from the surface constitutes at least 80% of the entire volume of the catalyst supporting layer. Thereby the invention achieves a high probability of contact of emissions with the NOx adsorber and the catalytic noble metal, so that the NOx absorbing performance in a lean atmosphere and the NOx releasing performance in a rich-pulse atmosphere are improved. The NOx purifying performance is thus improved.

Although reaction between the NOx adsorber and SOx occurs producing sulfuric acid salt, exhaust gas smoothly contacts the sulfate even in a rich-pulse atmosphere so that SOx is released from the sulfate and reduced before crystal of the sulfate grows, thereby recovering the NOx adsorbing capacity of the NOx adsorber. Therefore, sulfur poisoning is reduced and high NOx purifying performance is maintained for a long time.

If the portion of the catalyst supporting layer present within a depth of 100 $\mu$m from the surface is less than 80% of the entire volume of the catalyst supporting layer, it becomes difficult to achieve the aforementioned effects. The initial NOx purifying performance decreases and the extent of reduction in the NOx purifying performance after endurance becomes remarkably great.

As an example of the method for constructing a catalyst supporting layer in which the portion present within a depth of 100 $\mu$m from the surface constitutes at least 80% of the entire volume of the catalyst supporting layer, the number of cells of the honeycomb base member may be increased while the sectional area of the honeycomb base member is maintained at a fixed value. Since the surface area of the cell walls is thereby increased, the depth of the catalyst supporting layer can be reduced if the amount of the catalyst supporting layer formed is maintained at a fixed level. Thereby, the catalyst supporting layer can be constructed so that the portion present within a depth of 100 $\mu$m from the surface constitutes at least 80% of the entire volume of the catalyst supporting layer. To construct a catalyst supporting layer in which the portion present within a depth of 100 $\mu$m from the surface constitutes at least 80% of the entire volume of the catalyst supporting layer, simply by increasing the number of cells, it is preferred that the cell concentration be greater than 600 cells/inch$^2$. However, a cell concentration greater than 1200 cells/inch$^2$ is not suitable for an exhaust gas purifying catalyst for existing internal combustion engines, since if 1200 cells/inch² is exceeded, the gas passage resistance becomes great so that the pressure loss becomes excessively great.

If a conventional slurry method is employed to form the catalyst supporting layer, the sectional shape of cells of the honeycomb base member is preferably a polygon having more than 6 sides and, more preferably, a round shape. Such a preferred cell sectional shape provides a good balance between the surface tension of the slurry and the cell wall surface configuration. As a result, it becomes possible to construct a catalyst supporting layer in which the portion present within a depth of 100 μm from the surface constitutes at least 80% of the entire volume of catalyst supporting layer, simply by forming the catalyst supporting layer in substantially the same manner as in the conventional method. To increase the number of cells that can be arranged within a limited volume, it is preferred that the cell sectional shape be hexagonal. If the cell sectional shape is a polygon having more than six sides or a circular shape, the amount of dead space between the cell openings increase.

To provide polygonal cells in the honeycomb base member, it is possible to form a honeycomb base member having hexagonal cells. It is also possible to form substantially octagonal cells from quadrilateral cells by filling the four corners of each cell with a filler. However, this method reduces the cell capacity corresponding to the amount of the filler provided and, therefore, increases the gas passage resistance. Therefore, it is preferred to form a honeycomb base member that has hexagonal cells or more.

A slurry may be prepared using a liquid having a relatively small surface tension, such as propanol. By coating a honeycomb base member with such a slurry, the thickness of the catalyst supporting layer becomes more uniform than the thickness provided by an aqueous slurry. However, use of such an organic solvent may encounter a problem of a cost increase due to a facility required for preventing air pollution, or a problem of increased manhours due to an increased number of steps required for re-coating.

Examples of the honeycomb base member that may be used include a monolithic base member formed of a heat-resistant inorganic oxide such as cordierite and the like, a metallic base member, and the like.

The material of the catalyst supporting layer may include a material selected from γ-alumina, θ-alumina, silica, zirconia, titania, silica-alumina, zeolite, and the like, or a combination of any two or more of the materials.

Examples of the catalytic noble metal include platinum (Pt), rhodium (Rh), palladium (Pd), iridium (Ir), osmium (Os), Silver (Ag) and the like. It is also possible to use a base metal, such as iron (Fe), manganese (Mn), nickel (Ni), cobalt (Co), chrome (Cr) and the like, together with a catalytic noble metal. The amount of the catalytic noble metal supported by the catalyst supporting layer is preferably 0.1–20 g and, more preferably, 0.5–10 g relative to 100 g of the catalyst supporting layer, regardless of which noble metal is used. An amount of the catalytic noble metal exceeding the aforementioned preferred range does not achieve a significant increase in activity. If the amount is less than the aforementioned preferred range, a practically sufficient activity cannot be provided.

The NOx adsorbing material may be formed from at least one element selected from alkali metals, alkaline earth metals and rare earth metals. Examples of the alkali metals include lithium (Li), sodium (Na), potassium (K), cesium (Cs) and the like. The alkaline earth metals refer to elements of the 2A family according to the periodic table. Examples of the alkaline earth metals include magnesium (Mg), calcium (Ca), strontium (Sr), barium (Ba) and the like. Examples of the rare earth metals include lanthanum (La), cerium (Ce), praseodymium (Pr), and the like.

The amount of the NOx adsorbing material supported by the catalyst supporting layer is preferably within the range of 0.01–1.0 mole relative to 100 g of the catalyst supporting layer. If the amount of NOx adsorbing material is less than 0.01 mole, the NOx adsorbing capacity inconveniently decreases and the NOx removal performance accordingly decreases. If the amount of NOx adsorbing material is greater than 1.0 mole, no further increase in the NOx adsorbing capacity can be expected since it has already reached a plateau and, moreover, the HC emission may increase.

The NOx adsorbing material and the catalytic noble metal may be mounted in the catalyst supporting layer using their chlorides, nitric acid salts substantially, and the like, in the same manner as in a conventional method, that is, by employing a dipping method, a spray method, a slurry mixture method and the like.

EXAMPLES

The present invention will be described in detail with reference to Examples and Comparative Examples.

Example 1

Figure 1:
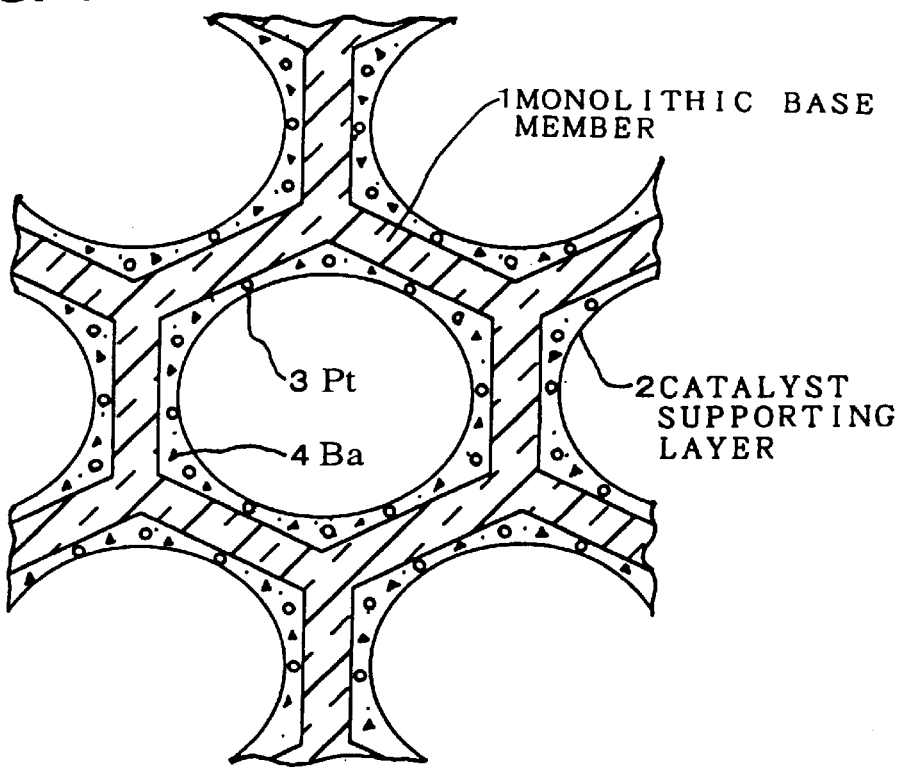
FIG. 1 is an enlarged sectional view of a portion of an exhaust gas purifying catalyst in Example 1 of the invention.

FIG. 1 is an enlarge view of an end surface of an exhaust gas purifying catalyst in Example 1 of the invention. The exhaust gas purifying catalyst is formed of a monolithic base member 1, and a catalyst supporting layer 2 formed on cell wall surfaces of the monolithic base member 1. The catalyst supporting layer 2 supports Pt 3 and Ba 4. The structure of the exhaust gas purifying catalyst will become apparent in the following description of a method for producing the exhaust gas purifying catalyst.

A honeycomb monolithic base member 1 formed of cordierite was prepared. The sectional shape of each cell was a regular hexagon. The entire sectional area was 83 cm², and the cell concentration was 400 cells/inch², and the apparent volume was 1.3 liters.

A slurry composed of 100 parts by weight of γ-alumina powder, 3 parts by weight of alumina sol containing 20 wt. % alumina, and 200 parts by weight of water was prepared. The monolithic base member 1 was dipped into and pulled out of the slurry. After extraneous slurry was blow off from the monolithic base member 1, the dipped monolithic base member 1 was dried at 120°°C. for 6 hours followed by baking at 500° C. for 3 hours, thereby forming a catalyst supporting layer 2. The amount of the catalyst supporting layer coating was 190 g relative to 1 liter of the monolithic base member 1.

The monolithic base member 1 carrying the catalyst supporting layer 2 was dipped in a platinum tetra-ammine hydroxide aqueous solution of a predetermined concentration for 2 hours, and then pulled out. After extraneous solution droplets were blown off, the monolithic base member 1 was dried at 250° C. for 1 hour. Subsequently, Pt 3 was mounted in the catalyst supporting layer 2. The amount of Pt 3 supported by the catalyst supporting layer 2 was 1.5 g relative to 1 liter of the monolithic base member 1.

The monolithic base member 1 carrying the catalyst supporting layer 2 supporting Pt 3 was dipped in a barium acetate aqueous solution of a predetermined concentration for 1 hour, and pulled out. After extraneous solution droplets were blown off, the monolithic base member 1 was dried at 250° C. for 1 hour. Subsequently, Ba 4 was mounted in the catalyst supporting layer 2. The amount of Ba 4 supported by the catalyst supporting layer 2 was 0.2 mole relative to 1 liter of the monolithic base member 1.

Figure 2:
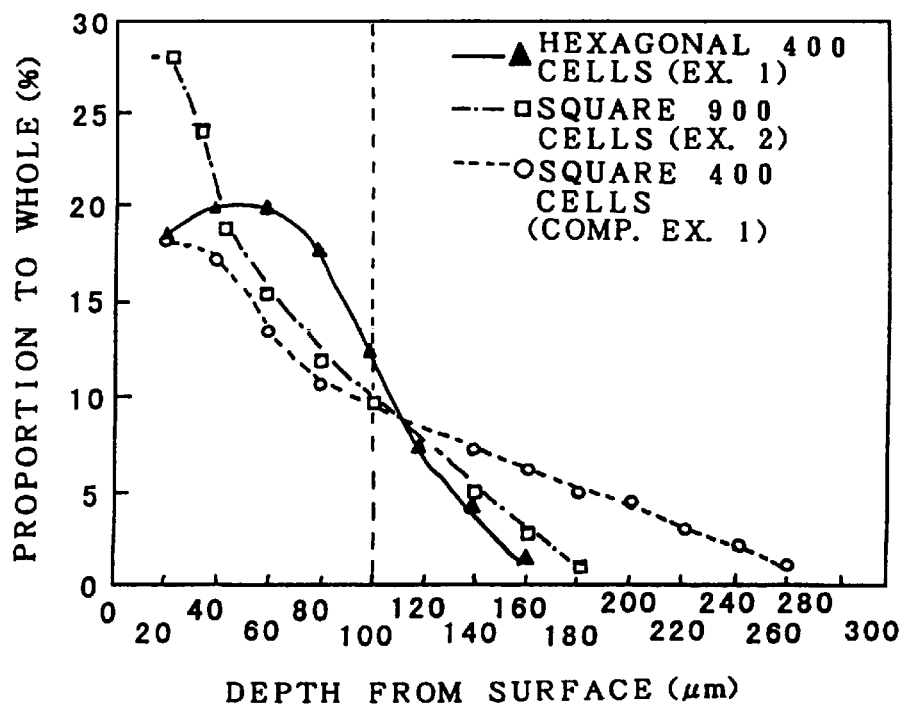
FIG. 2 is a graph indicating the volume distribution of a catalyst supporting layer over the depth from the surface of the catalyst supporting layer of the embodiment.
Figure 3:
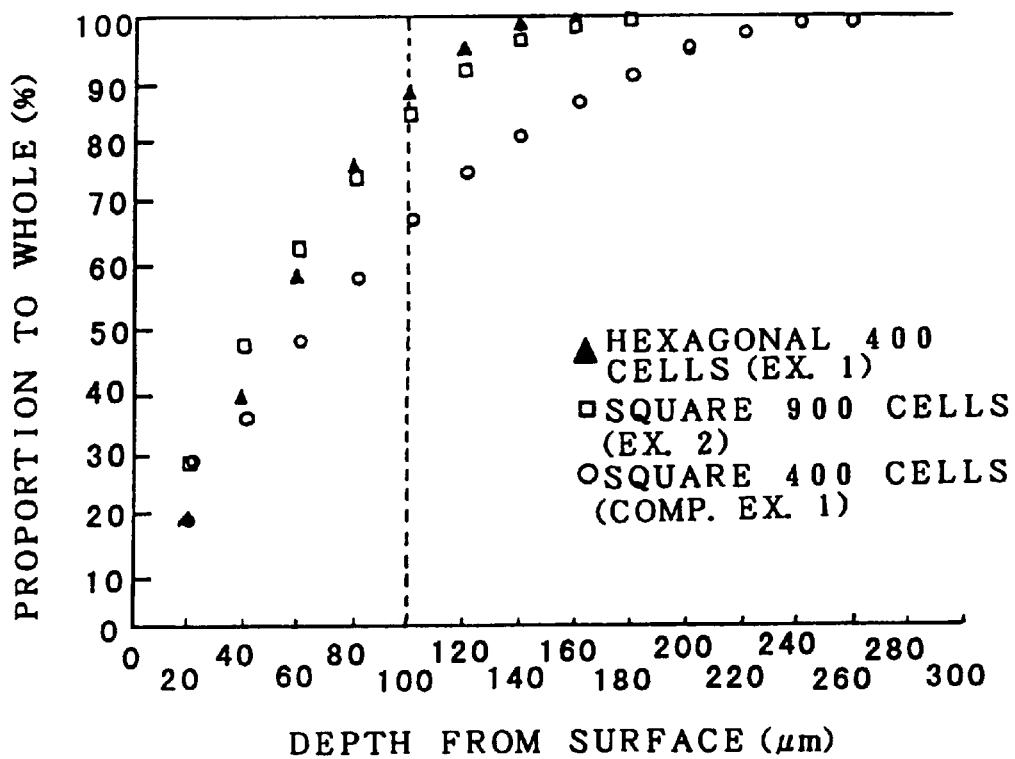
FIG. 3 is a graph indicating the accumulated volume distribution of the catalyst supporting layer relative to the depth from the surface, based on the graph of FIG. 2.

The distribution of coat volume relative to depths in the catalyst supporting layer 2 of the thus-obtained catalyst of Example 1 was determined through image processing of a microscopic photograph of the catalyst supporting layer 2. Results are indicated in FIG. 2, and the amounts of coating accumulated from the shallow portion are indicated in FIG. 3. As indicated in FIGS. 2 and 3, the portion of the catalyst supporting layer 2 present within a depth of 100 μm from the surface constituted 88% of the entire volume of the catalyst supporting layer 2.

Example 2

A catalyst of Example 2 was prepared in substantially the same manner as in Example 1, except that the cell sectional shape of a monolithic base member 1 was square, and that the cell concentration was 900 cells/inch². The distribution of coat volume relative to depths in the catalyst supporting layer 2 of the thus-obtained catalyst of Example 2 was determined in the same manner as in Example 1. Results are indicated in FIG. 2, and the amounts of coating accumulated from the shallow portion are indicated in FIG. 3. As indicated in FIGS. 2 and 3, the portion of the catalyst supporting layer 2 present within a depth of 100 μm from the surface constituted 85% of the entire volume of the catalyst supporting layer 2.

Example 3

A catalyst of Example 3 was prepared in substantially the same manner as in Example 1, except that the cell sectional shape of a monolithic base member 1 was regular hexagonal, and that the cell concentration was 300 cells/inch². In the catalyst of Example 3, the portion of the catalyst supporting layer present within a depth of 100 μm from the surface constituted 80% of the entire volume of the catalyst supporting layer.

Comparative Example 1

As shown in FIG. 9, a catalyst of Comparative Example 1 was prepared in substantially the same manner as in Example 1, except that the cell sectional shape of a monolithic base member 1' was square, and that the cell concentration was 400 cells/inch². The distribution of coat volume relative to thicknesses in the catalyst supporting layer 2' was determined in the same manner as in Example 1. Results are indicated in FIG. 2, and the amounts of coating accumulated from the shallow portion are indicated in FIG. 3. As indicated in FIGS. 2 and 3, the portion of the catalyst supporting layer 2' present within a depth of 100 μm from the surface constituted 65% of the entire volume of the catalyst supporting layer 2', which are less than those of Examples 1, 2 and 3.

Comparative Example 2

A catalyst of Comparative Example 2 was prepared in substantially the same manner as in Example 1, except that the cell sectional shape was quadrilateral, and that the cell concentration was 600 cells/inch². In the catalyst of Comparative Example 2, the portion of the catalyst supporting layer present within a depth of 100 μm from the surface constituted 75% of the entire volume of the catalyst supporting layer, which are less than those of Examples 1, 2 and 3.

Test and Evaluation

Figure 4:
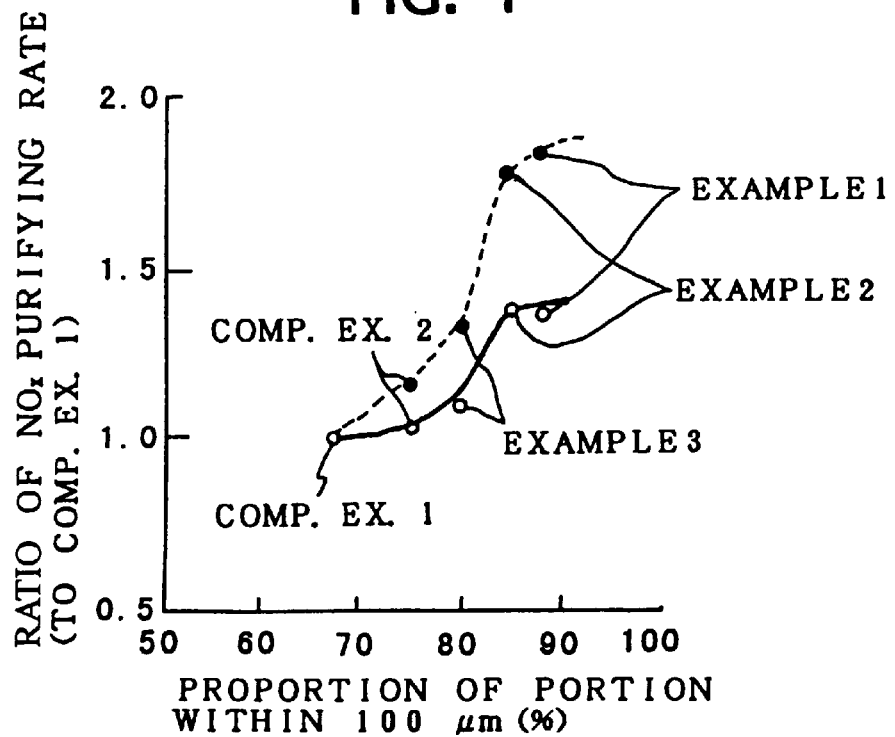
FIG. 4 is a graph indicating the relationship between the proportion of portion of the catalyst supporting layer extending within a depth of 100 $\mu$m from the surface to the entire layer and the ratio of the NOx removal rate of catalysts according to the invention to that of Comparative Example 1.

After the obtained catalysts were set in an evaluating device, initial NOx purifying rates were determined by alternately applying lean-side model exhaust gas and rich-side model exhaust gas which are described in Table 1, for two minutes respectively at a flow rate of 2 L/min. The in-coming gas temperature was 350° C. The ratio of the initial NOx purifying rate of each catalyst to that of the catalyst of Comparative Example 1 was calculated. Results are indicated in FIG. 4. The NOx purifying rate was defined by the following equation.

NOx purifying rate=100×[1−(NOx content in out-going gas during 4 minutes/NOx content in in-coming gas during 4 minutes)]

TABLE 1

| Gas Con. | $O_2$ % | NO ppm | $C_3H_6$ ppm | CO % | $H_2$ % | He |
|---|---|---|---|---|---|---|
| Lean | 7.0 | 400 | 830 | 0.1 | — | residue |
| Rich | 0.2 | 2200 | 765 | 1.0 | 0.3 | residue |

As apparent from the graph of FIG. 4, Examples 1 to 3, wherein the portion of the catalyst supporting layer present within the depth of 100 μm from the surface constituted at least 80% of the entire volume of the catalyst supporting layer, achieved higher NOx purifying rates than Comparative Example 1.

The obtained catalysts were set in endurance test devices, and an endurance test was performed by switching between lean-side model exhaust gas and rich-side model exhaust gas which are described in Table 2, in a switching pattern of 55 second and 5 second for the lean and rich-side exhaust gases, at an in-coming gas temperature of 650° C. for 5 hours.

TABLE 2

| Gas Conc. | $O_2$ % | NO % | $C_3H_6$ ppm | CO % | $H_2$ % | $SO_2$ ppm | $H_2O$ % | $N_2$ % |
|---|---|---|---|---|---|---|---|---|
| Lean | 7.0 | 400 | 830 | 0.1 | — | 120 | 3 | residue |
| Rich | — | 500 | 1060 | 6.0 | 0.2 | 120 | 3 | residue |

NOX purifying rates after endurance were determined by measuring the NOx purifying rate of each catalyst in substantially the same manner as in the initial NOx purifying rates. The ratio of the NOx purifying rate after the endurance test of each catalyst to that of Comparative Example 1 was calculated. Results are indicated in FIG. 4.

As apparent from the graph of FIG. 4, Examples 1 to 3, wherein the portion of the catalyst supporting layer present within the depth of 100 μm from the surface constituted at least 80% of the entire volume of the catalyst supporting layer, achieved higher NOx purifying rates after the endurance test than Comparative Example 1. As the proportion of the portion of the catalyst supporting layer present within the depth of 100 μm from the surface to the entire catalyst supporting layer increased, the NOx purifying rate improved. The NOx purifying rate improved particularly in a range of proportions equal to and greater than 80%. The catalyst of Example 1 exhibited performance 1.8 times as great as that of Comparative Example 1.

Figure 5:
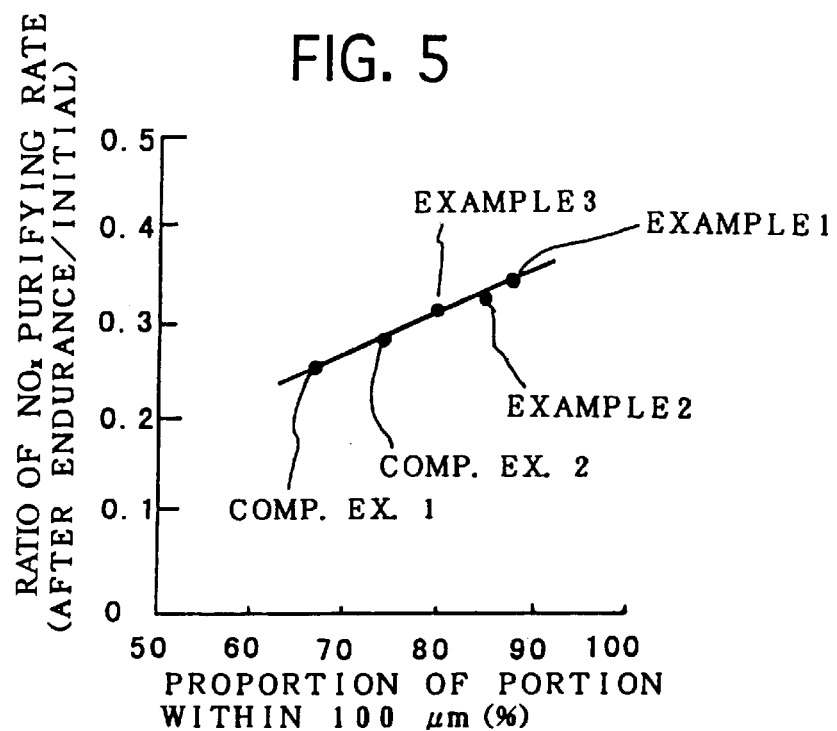
FIG. 5 is a graph indicating the relationship between the proportion of portion of the catalyst supporting layer extending within a depth of 100 $\mu$m from the surface to the entire layer and the ratio of the NOx removal rate after endurance to the NOx removal rate during an initial period.
Figure 6:
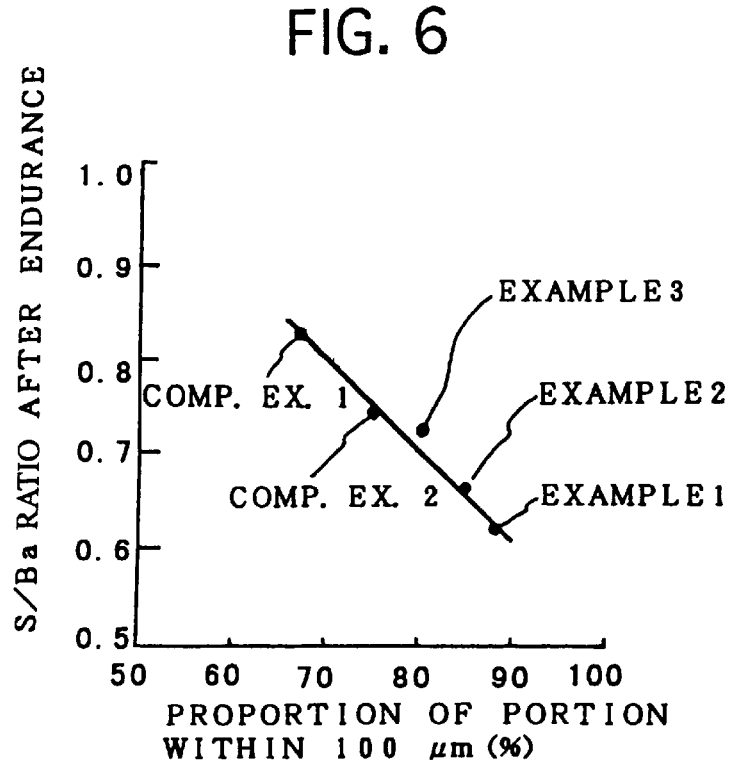
FIG. 6 is a graph indicating the relationship between the proportion of portion of the catalyst supporting layer extending within a thickness of 100 $\mu$m to the entire layer and the ratio of S to Ba in the catalyst supporting layer.
Figure 7:
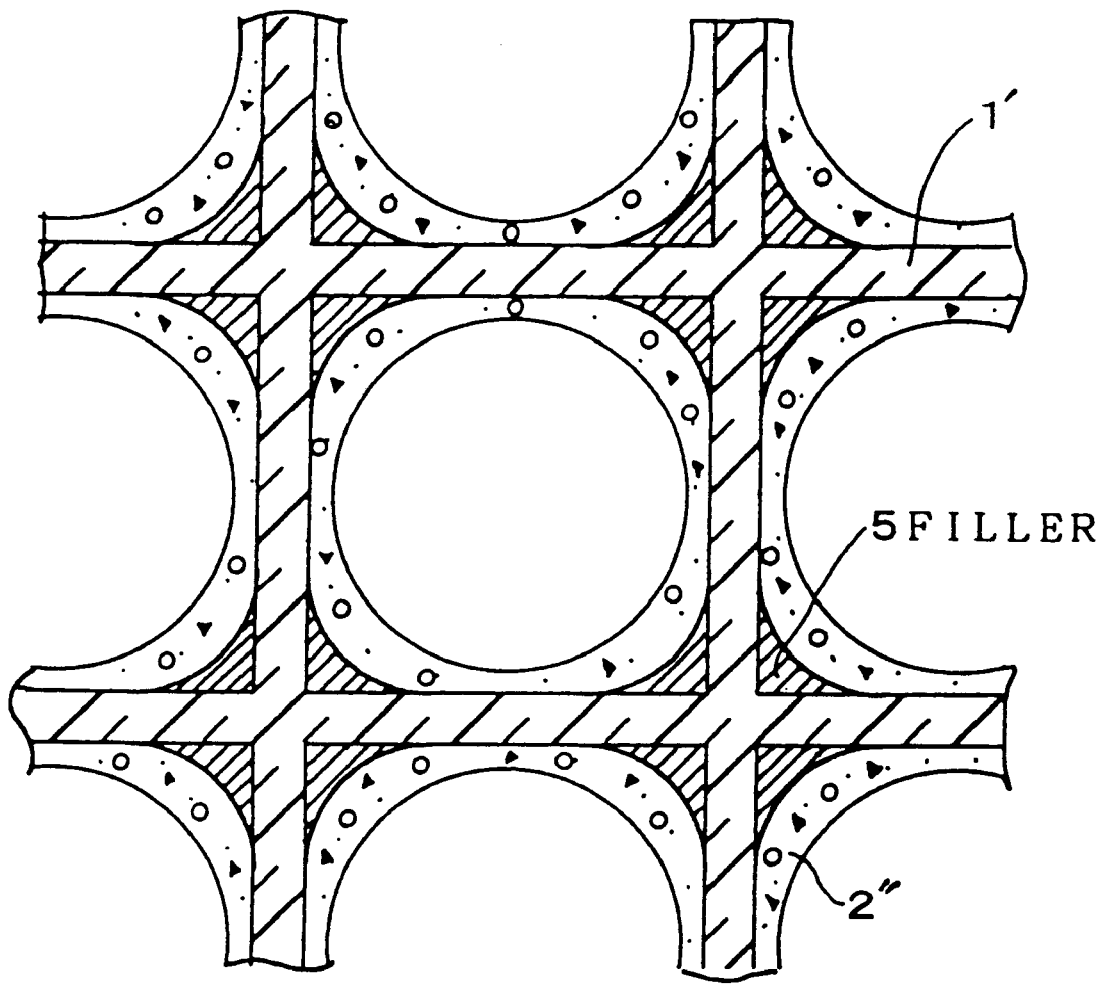
FIG. 7 is an enlarged sectional view of a portion of an exhaust gas purifying catalyst in Example 4 of the invention.

The ratio of the initial NOx purifying rate to the NOx purifying rate after he endurance test was calculated with respect to each catalyst. Results are indicated in FIG. 5. Analysis of elements contained in the catalyst supporting layer of each catalyst after the endurance test was performed. The ratio of S to Ba was calculated with respect each catalyst. Results are indicated in FIG. 6.

As apparent from the graph of FIG. 5, as the proportion of the portion of the catalyst supporting layer present within the depth of 100 μm from the surface increased, the NOx purifying rate after the endurance test improved. As apparent from the graph of FIG. 6, as the proportion of the portion of the catalyst supporting layer present within the depth of 100 μm from the surface increased, the amount of S after the endurance test decreased, which means that the sulfur poisoning decreased. It is clearly indicated that the improvements in NOx purifying rate after the endurance test were caused by the reduced sulfur poisoning on Ba. In Comparative Example 1, 80% or more of Ba, which is a NOx adsorber, was affected by sulfur poisoning. In contrast, in Example 1, the sulfur poisoning on Ba was reduced to about 60%, which was apparently caused by the construction of catalyst supporting layer wherein the proportion of the portion present within the depth of 100 μm from the surface was at least 80%.

Example 4

In this example, a honeycomb base member 1' as used in Comparative Example 1 was used, and the four corners of each cell of the base member were filled with a filler 5 in a substantially triangle sectional shape. The filling with the filler 5 was achieved by applying 60 g of a silica-based inorganic adhesive relative to 1 liter of the monolithic base member, and then backing the coated base member. The cell sectional shape thereby became substantially octagonal.

A catalyst supporting layer 2" was formed, and Pt and Ba were mounted in substantially the same manner as in Example 1. In the thus-obtained catalyst, the portion of the catalyst supporting layer 2" present within the depth of 100 μm from the surface constituted 85% of the entire catalyst supporting layer 2". The NOx purifying rates during an initial period and after the endurance test were substantially the same as those of Example 1.

Example 5

Figure 8:
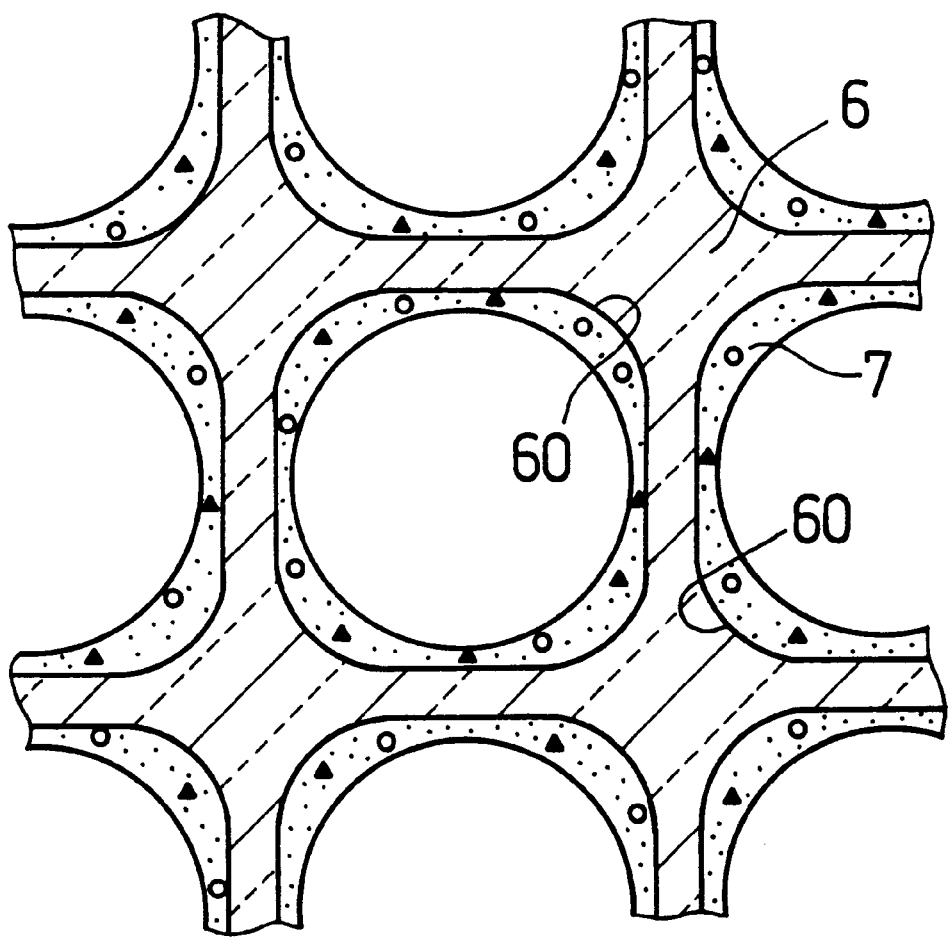
FIG. 8 is an enlarged sectional view of a portion of an exhaust gas purifying catalyst in Example 5 of the invention.

In this example, as shown in FIG. 8, a honeycomb base member 6 was used. The sectional shape of the base member was a square and the four corners 60 of each cell of the base member was formed in a circular sectional shape. So, the cell sectional shape became substantially octagonal, which was the same shape as that of the Example 4. Therefore, as shown in Table 3, in a catalyst supporting layer 7, the proportion of the portion present within the depth of 100 μm from the surface was at least 80%.

Furthermore, in this example, the number of cells and the corner R (radius of the corner 60) were variously changed, and the distribution of coat volume relative to thicknesses in the catalyst supporting layer 7 was determined. Then, the proportion of the portion of the catalyst supporting layer 7 present within the depth of 100 μm from the surface with respect to the entire volume of the catalyst supporting layer 7 was calculated. The result was shown in Table 3.

As shown in Table 3, in the catalyst of the Example 5, it is apparent that the portion of the catalyst supporting layer 7 present within the depth of 100 μm from the surface constituted not less than 80% of the entire volume of the catalyst supporting layer 7. Furthermore, it is confirmed that the NOx purifying rates of the catalyst of the Example 5 during an initial period and after the endurance test were the same as those of the Examples 1 to 4.

TABLE 3

| number of cells | opening area of 1 cell (mm²) | corner R (mm) | coating amount (g/L) | minimum thickness (μm) | maximum thickness (μm) | proportion of portion within 100 μm (%) |
| --- | --- | --- | --- | --- | --- | --- |
| 300 | 1.727 | 0.4 | 180 | 46 | 152 | 80.8 |
| 400 | 1.249 | 0.3 | 180 | 36 | 143 | 84.7 |
| 500 | 0.967 | 0.2 | 180 | 25 | 146 | 84.5 |

As apparent from the foregoing description, the exhaust gas purifyng catalyst of the present invention is excellent in the initial NOx purifying rate and also excellent in durability of the NOx purifying rate due to reduced sulfur poisoning. Therefore, the exhaust gas purifying catalyst of the present invention will help achieve further reductions in fuel consumption of lean burn engines and allow development of lean burn engines with increased displacements. Furthermore, if the exhaust gas purifying performance is allowed to remain the same as in the conventional art, the amounts of a catalytic noble metal and a NOx adsorber used can be reduced and, therefore, the costs can be reduced.

While the present invention has been described with reference to what is presently considered to be preferred embodiments thereof, it is to be understood that the invention is not limited to the disclosed embodiment, examples or constructions. To the contrary, the invention is intended to cover various modifications and equivalent arrangements included within the spirit and scope of the appended claims.

What is claimed is:

1. An exhaust gas purifying catalyst comprising:
    a base member having a honeycomb structure, cells of said base member having a sectional shape of a regular hexagon;
    a catalyst supporting layer formed on a surface of a cell wall of said base member, said catalyst supporting layer having an outer surface that is in direct physical contact with exhaust gases to be purified;
    a catalytic noble metal loaded on said catalyst supporting layer; and
    a NOx adsorbing material loaded on said catalyst supporting layer,
    wherein said catalyst supporting layer is present in an amount of more than 100 g per liter of said base member and at least 80% by volume of said catalyst supporting layer relative to a total volume of said catalyst supporting layer is present within a depth of 100 μm from said outer surface.

2. An exhaust gas purifying catalyst according to claim 1, wherein the base member has a cell concentration in the range of from 600 to 1200 cells/inch².

3. An exhaust gas purifying catalyst according to claim 1, wherein cells of the base member having a sectional shape of a hexagon are formed by filling the four corners of cells having a square sectional shape with a filler to form said hexagon.

4. An exhaust gas purifying catalyst according to claim 1, wherein said catalyst supporting layer is formed by dipping the base member in a non-aqueous slurry, said non-aqueous slurry being in a liquid having smaller surface tension than that of water.

5. An exhaust gas purifying catalyst according to claim 1, wherein said catalyst supporting layer comprises at least one material selected from the group consisting of alumina, silica, zirconia, titania, silica-alumina and zeolite.

6. An exhaust gas purifying catalyst according to claim 5, wherein said alumina is γ-alumina or θ-alumina.

7. An exhaust gas purifying catalyst according to claim 1, wherein said catalytic noble metal is selected from the group consisting of platinum, rhodium, palladium, iridium, osmium and silver.

8. An exhaust gas purifying catalyst according to claim 1, wherein the catalytic noble metal is present in an amount of from 0.1–20 g relative to 100 g of the catalyst supporting layer.

9. An exhaust gas purifying catalyst according to claim 1, wherein the NOx adsorbing material is selected from the group consisting of alkali metals, alkaline earth metals and rare earth metals.

10. An exhaust gas purifying catalyst according to claim 1, wherein said NOx adsorbing material is present in an amount of from 0.01–1.0 mole relative to 100 g of the catalyst supporting layer.

11. An exhaust gas purifying catalyst comprising:
    a base member having a honeycomb structure;
    a catalyst supporting layer formed on a surface of a cell wall of said base member, said catalyst supporting layer having an outer surface that is in direct physical contact with exhaust gases to be purified;
    a catalytic noble metal loaded on said catalyst supporting layer; and
    a NOx adsorbing material loaded on said catalyst supporting layer,
    wherein said catalyst supporting layer is present in an amount of more than 100 g per liter of said base member and at least 80% by volume of said catalyst supporting layer relative to a total volume of said catalyst supporting layer is present within a depth of 100 μm from said outer surface.

12. An exhaust gas purifying catalyst according to claim 11, wherein the base member has a cell concentration in the range of from 600 to 1,200 cells/inch$^2$.

13. An exhaust gas purifying catalyst according to claim 11, wherein cells of the base member have a sectional shape of a polygon having more than six sides.

14. An exhaust gas purifying catalyst according to claim 11, wherein cells of the base member have a circular shape.

15. An exhaust gas purifying catalyst according to claim 11, wherein said catalyst supporting layer comprises at least one material selected from the group consisting of alumina, silica, zirconia, titania, silica-alumina and zeolite.

16. An exhaust gas purifying catalyst according to claim 15, wherein said alumina is γ-alumina or θ-alumina.

17. An exhaust gas purifying catalyst according to claim 11, wherein said catalytic noble metal is selected from the group consisting of platinum, rhodium, palladium, iridium, osmium and silver.

18. An exhaust gas purifying catalyst according to claim 11, wherein the catalytic noble metal is present in an amount of from 0.1–20 g relative to 100 g of the catalyst supporting layer.

19. An exhaust gas purifying catalyst according to claim 11, wherein the NOx adsorbing material is selected from the group consisting of alkali metals, alkaline earth metals and rare earth metals.

20. An exhaust gas purifying catalyst according to claim 11, wherein said NOx adsorbing material is present in an amount of from 0.01–1.0 mole relative to 100 g of the catalyst supporting layer.

* * * * *